Dec. 24, 1963

A. WINKLER 3,115,077

PHOTOGRAPHIC CAMERA

Filed July 6, 1961

INVENTOR.

ALFRED WINKLER

BY

Michael S. Striker

Dec. 24, 1963  A. WINKLER  3,115,077
PHOTOGRAPHIC CAMERA
Filed July 6, 1961  3 Sheets-Sheet 2

INVENTOR.
ALFRED WINKLER
BY

Dec. 24, 1963     A. WINKLER     3,115,077
PHOTOGRAPHIC CAMERA
Filed July 6, 1961     3 Sheets-Sheet 3
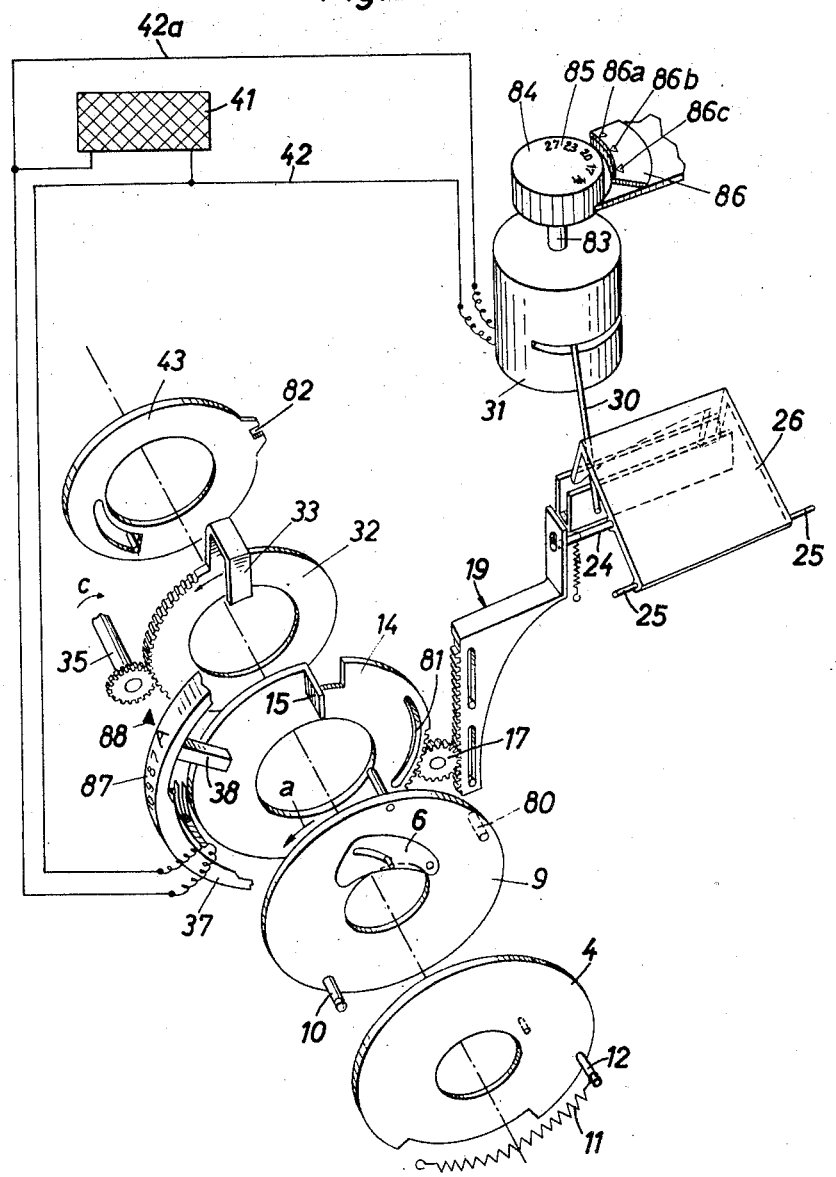
INVENTOR.
ALFRED WINKLER
BY Michael S. Striker
Attorney

3,115,077
PHOTOGRAPHIC CAMERA
Alfred Winkler, Munich, Germany, assignor to Agfa Aktiengesellschaft, Leverkusen-Bayerwerk, Germany
Filed July 6, 1961, Ser. No. 122,184
Claims priority, application Germany July 12, 1960
16 Claims. (Cl. 95—10)

The present invention relates to cameras in general, and more particularly to one-eyed reflection cameras with a built-in photometer and exchangeable objectives each of which includes a diaphragm the arrangement being such that, after camera release for exposure, the diaphragm, from the fully open position, closes to a predetermined aperture value under spring loading.

An important object of the invention is to provide a camera of this kind which is constructed and assembled in such a way that the diaphragm which is provided in the objective may be adjusted automatically or manually and that the manual diaphragm adjusting means cannot interfere with the automatic diaphragm adjusting means or vice versa.

Another object of the invention is to provide an improved operative connection between an interlens diaphragm provided in an exchangeable objective and the photometer which is mounted in the camera housing.

A further object of the invention is to provide a camera of the above outlined characteristics wherein the diaphragm may be adjusted in a fully automatic way in dependency on one or more factors other than the lighting conditions.

An additional object of my invention is to provide a camera of the above described type wherein any adjustments of the diaphragm automatically result in corresponding adjustments of the exposure time.

Still another object of the instant invention is to provide an automatic control system for the diaphragm of a detachable objective in reflection cameras which comprises a comparatively small number of component parts that occupy a small space in the camera housing and in the objective, and which is automatically locked against operation when it is desired to manually adjust the diaphragm.

With the above objects in view, the invention resides in the provision of a camera having a housing, an objective releasably connected with the housing, a diaphragm mounted in the objective and comprising rotary adjusting means for varying the diaphragm opening, means for permanently biasing the adjusting means in a direction to close the diaphragm opening, movable control means provided in the housing, means provided on the adjusting means and on the control means for transmitting motion of the adjusting means to the control means when the adjusting means rotates under the action of the biasing means, means for moving the control means and the adjusting means counter to the action of the biasing means so as to fully open the diaphragm, and means comprising a photometer and an operative connection between the photometer and the control means for arresting the control means and hence the adjusting means in a position corresponding to momentary lighting conditions detected by the photometer whereby the diaphragm is adjusted in accordance with the lighting conditions.

Certain other features of the invention reside in the provision of a special connection between the photometer and the control means which includes a lost motion mechanism, in the provision of a preferably releasable connection between the diaphragm adjusting means and the exposure time setting means so that the exposure time setting means is adjusted automatically in response to adjustments of the diaphragm, in the provision of means for automatically inactivating the operative connection between the photometer and the diaphragm adjusting means and for automatically inactivating the photometer when the diaphragm is adjusted manually so that the automatic diaphragm adjusting means cannot interfere with the manual adjusting means or vice versa, in the provision of an operative connection between the exposure time setting means and the photometer so as to influence the adjustment of the diaphragm in accordance with the lighting conditions and with the selected exposure time, and in the provision of means for adjusting the photometer in dependency on the sensitivity of the film which is being utilized in the camera so that the diaphragm is adjusted in accordance with the film sensitivity.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 3 is an exploded view of certain components forming part of a modified camera in which the diaphragm adjusting means controls the exposure time setting mechanism.

Figure 1:
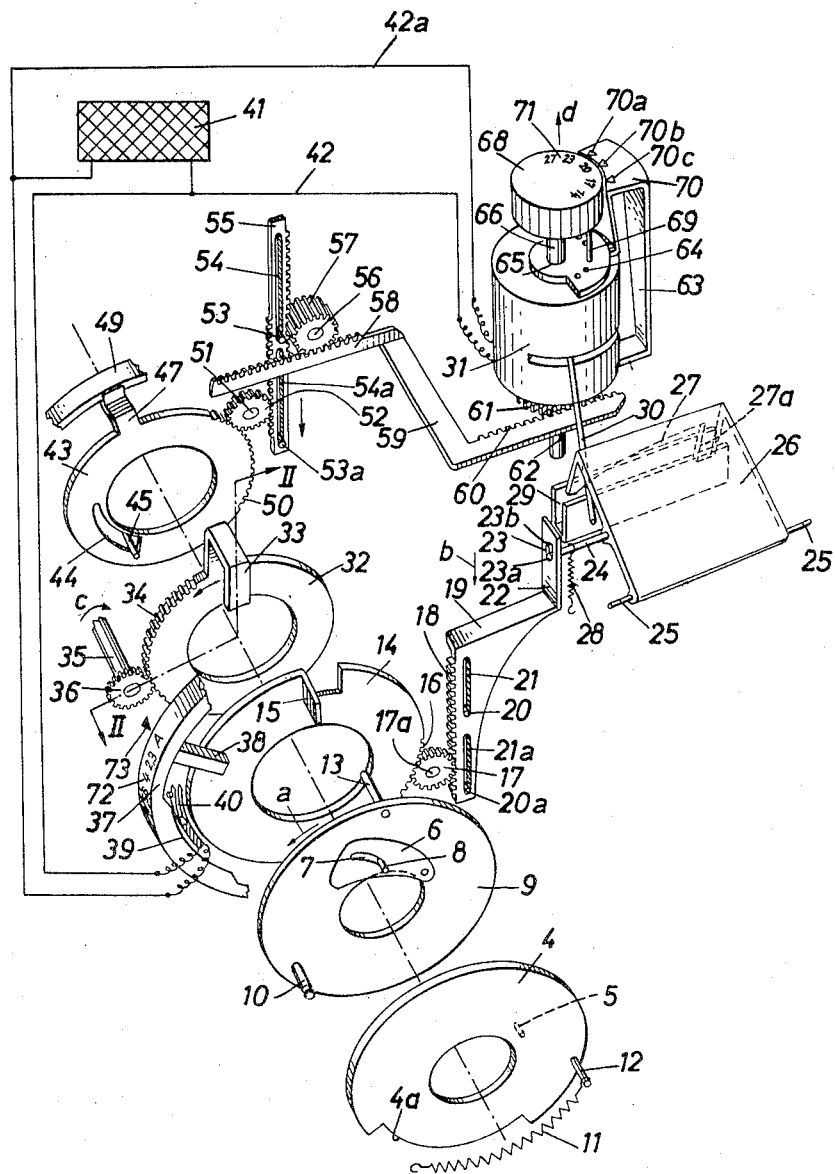
FIG. 1 is an exploded perspective view of certain components forming part of a camera embodying one form of my invention.
Figure 2:
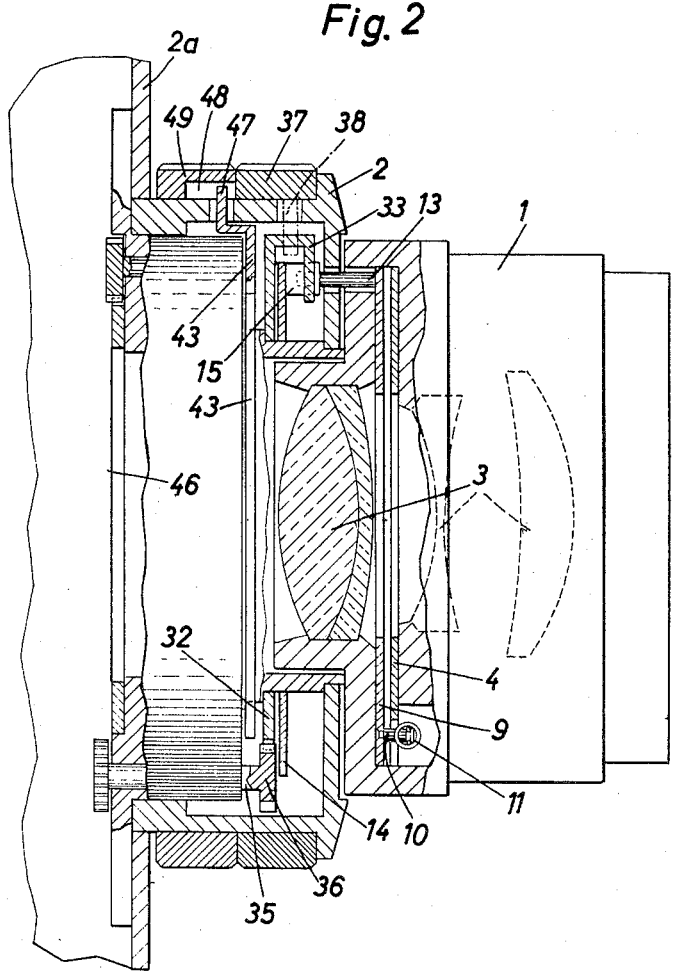
FIG. 2 is a fragmentary partly elevational and partly sectional view of the camera as seen in the direction of arrows from the line II—II in FIG. 1.

Referring now in greater detail to the illustrated embodiments, and first to FIGS. 1 and 2, there is shown a so-called "one-eyed" reflection camera which includes an exchangeable objective 1. This objective is releasably connectable with a tube 2 which is provided on the front wall 2a of the camera housing. The exact construction of the connection between the objective 1 and the tube 2 forms no part of the present invention; for example, this connection may comprise a bayonet lock assembly of any known design.

The objective 1 comprises an objective lens system 3 and accommodates a diaphragm supporting ring or carrier 4 which is fixedly received in the objective. The ring 4 is provided with a series of rearwardly extending pivot pins 5 (only one shown in FIG. 1) for diaphragm blades 6 of the interlens type each of which is provided with a guide slot 7 for a guide pin 8 connected to a rotary adjusting ring 9, the latter mounted in the objective 1 rearwardly of the ring 4. The configuration of the slots 7 is such that the blades 6 will pivot about the respective pins 5 when the ring 9 is rotated with respect to the ring 4.

The adjusting ring 9 carries a forwardly extending pin-shaped projection 10 which is connected to one end of a biasing means here shown as a helical expansion spring 11. The other end of this spring is connected to a pin 12 which is secured to the front side of the supporting ring 4. The spring 11 always tends to rotate the adjusting ring 9 in the direction indicated by the arrow $a$ so as to move the diaphragm blades 6 to their closing position in which the blades screen the concentric opening in the supporting ring 4. The projection 10 extends through and is movable longitudinally of a peripheral cutout 4a in the ring 4.

The adjusting ring 9 is further provided with a rearwardly extending pin-shaped motion transmitting projection 13 which is parallel with the optical axis of the objective 1 and which serves as a means for arresting the adjusting ring and hence the diaphragm blades 6 in a given position which corresponds to momentary lighting conditions. The manner in which the projection 13 controls the angular position of the adjusting ring 9 will be fully described hereinafter.

The tube 2 of the camera housing accommodates a control ring 14 which is freely movable (i.e. rotatable) therein and which carries a radially extending motion transmitting stop 15, the latter projecting forwardly in a direction toward the adjusting ring 9. The stop 15 is arranged in such a way that it extends into the path of the projection 13 when the objective 1 is secured to the tube 2 (see FIG. 2). In other words, the projection 13 transmits motion to the stop 15 and the stop transmits motion to the ring 14 when the ring 9 is rotated in the direction of the arrow $a$ under the bias of the spring 11 so as to move the diaphragm blades 6 to their closing position.

The control ring 14 is provided with a toothed segment 16 which meshes with an intermediate gear 17, the latter freely rotatable about its shaft 17a which is mounted in the camera housing. The gear 17 also meshes with a rack 18 provided on a regulating member 19, hereinafter called slide, which is formed with a pair of elongated guide slots 21, 21a. These slots respectively receive guide pins 20, 20a which are fixed to the camera housing and which permit the slide 19 to reciprocate in and counter to the direction indicated by the arrow $b$. It will be noted that the segment 16, the gear 17 and the rack 18 constitute means for transforming angular movements of the rotary control ring 14 into reciprocatory movements of the slide 19. The latter is provided with a lug 22 which is formed with an elongated slot 23 for a follower pin 24. This follower pin is connected to a cam 26 which is rockable about the common axis of two journals 25 mounted in the camera housing. The cam 26 is provided with a cam face 27. A comparatively weak spring 28 connected to the follower pin 24 permanently biases the cam 26 in anticlockwise direction, as viewed in FIG. 1, so as to move the follower pin 24 into abutment with the front end wall 23a of the slot 23, i.e. to move the follower pin in the direction of the arrow $b$. The follower pin 24 engages with the front end wall 23a and is caused to rock the cam 26 in clockwise direction against the bias of the spring 28 when the slide 19 is moved counter to the direction indicated by the arrow $b$. During such clockwise movement of the cam 26, the latter's cam face 27 is moved away from a substantially rod-shaped pointer 30 which is slidable along the guide edge of a fixed support 29. The pointer 30 forms part of a moving coil instrument 31 which is electrically connected with a photoelectric cell 41 by means of conductors 42, 42a. The instrument 31 and the cell 41 together constitute the photometer of my camera, and the parts 16—29 together constitute an operative connection between the pointer 30 and the control ring 14.

The slot 23 has a second end wall 23b which comes into abutment with the follower pin 24 when the slide 19 is moved in the direction of the arrow $b$ during rotation of the adjusting ring 9 in the direction of the arrow $a$. During such movement of the slide 19, the spring 28 causes the face 27 of the cam 26 to move into abutment with the pointer 30.

The tube 2 accommodates a rotary annular tensioning and releasing member or ring 32 which is located rearwardly of and is concentric with the control ring 14. The tensioning ring 32 is releasable by the customary trigger for the shutter mechanism (not shown) and is formed with a motion transmitting bracket 33 which is located in front of the stop 15, as seen in the direction of the arrow $a$. In addition, the ring 32 comprises a toothed segment 34 which meshes with a driver gear 36 mounted on a shaft 35. The shaft 35 cooperates with the film transporting mechanism and turns the adjusting ring 9 through the parts 36, 34, 33, 32, 15, 14, 13 in a direction counter to the arrow $a$ to fully open the diaphragm blades 6. Immediately before the shutter is released to illuminate a new portion of the film, the adjusting ring 9 is rotated in the direction of the arrow $a$ so that the blades 6 may move under the bias of the spring 11 to a predetermined extent, i.e. so as to form an opening of predetermined magnitude for the passage of light rays when the shutter is released.

The tube 2 is surrounded by a manually operable rotary selector ring 37 which is provided with a graduated scale 72 indicating the various diaphragm openings. The selector ring 37 cooperates with a fixed index or marker 73 which is provided on the tube 2. A motion transmitting finger 38 of the selector ring 37 is movable independently of the stop 15 and is adapted to cooperate with the projection 13 of the adjusting ring 9. At its inner side, the selector ring 37 is provided with an arcuate control cam 39 whose length equals the maximum angular distance which the ring 32 can cover in order to change the diaphragm opening from its maximum to its minimum magnitude or vice versa. The cam 39 controls a normally open switch 40 which is connected in the circuit of the photoelectric cell 41. When the switch 40 is closed, no current can flow from the cell 41 to the moving coil instrument 31.

The tube 2 accommodates a rotary exposure time setting ring 43 which is formed with a cam slot 44 for a follower pin 45 of an exposure time setting mechanism accommodated in a casing 46 shown in FIG. 2. A bent-over radial lug 47 of the setting ring 43 extends into a recess 48 formed in a manually adjustable outer exposure time setting ring 49 which surrounds the tube 2 and is adjacent to the diaphragm opening selector ring 37. The rings 43, 49 and the mechanism in the casing 46 together constitute the exposure time setting means of my camera.

The inner setting ring 43 is formed with a toothed segment 50 which meshes with an intermediate gear 52 whose shaft 51 is mounted in the camera housing. The gear 52 is in mesh with a first set of teeth provided on a reciprocable rack 55. This rack is formed with a pair of elongated guide slots 54, 54a which are aligned with each other and which accommodate guide pins 53, 53a, the latter fixedly mounted in the camera housing so that the rack 55 is caused to perform reciprocatory movements in the longitudinal direction of the slots 54, 54a in response to clockwise and anticlockwise angular movements of the inner setting ring 43. A second set of teeth on the rack 55 meshes with an intermediate gear 57 which is mounted on a fixed shaft 56 and which meshes with a toothed rack 58, the latter reciprocable in directions substantially perpendicular to the longitudinal direction of the rack 55. It will be noted that the axial length of the gear 57 is selected in such a way that this gear may mesh simultaneously with the rack 55 and with the rack 58 though the racks 55, 58 are disposed in two parallel planes. The rack 58 is provided with an offset arm 59 which carries a further rack 60 in mesh with a gear 61, the latter rigid with a shaft 62 which is rotatably mounted in bearings (not shown) in the camera housing. The gear 61 is rigidly connected with a bracket 63 which straddles the moving coil instrument 31. The instrument 31 is freely rotatable on and is coaxial with the shaft 62. The bracket 63 has a free arm which extends along the upper end face of the instrument 31, as viewed in FIG. 1, and which is formed with a series of arcuately arranged bores 64 and with a further bore 65 concentric with the gear 61. The bore 65 receives a shaft 66 which is rigidly secured to the instrument 31 and which is also connected with a film sensitivity selecting knob 68. The knob 68 is provided with a coupling pin 69 which may be received in one of the bores 64 to releasably connect the gear 61 and the bracket 63 with the instrument 31 and knob 68. The knob 68 is permanently biased by a spring, not shown, so that its pin 69 automatically enters one of the bores 64 when the knob is released. This knob is provided externally of the camera housing so as to be readily accessible to an operator. The bracket 63 is formed with markers 70a, 70b, 70c which cooperate with a film sensitivity indicating graduated scale 71 provided on the exposed end face of the knob 68. The markers 70a, 70b, 70c may be differently colored or each thereof may be associated with a legend or the like indicating a different diaphragm opening, i.e. the maximum diaphragm opening of a given exchangeable objective. It is preferred to construct the moving coil instrument 31 in such a way that the axis of the shaft 62 coincides with the axis of the coil proper and with the axis of the shaft 66.

It is now assumed that the user desires to take a picture with automatic regulation of the diaphragm opening. The trigger (not shown) is operated to permit rotation of the spring-biased shaft 35 in the direction indicated by the arrow c, whereby the revolving driver gear 36 rotates the tensioning ring 32 in the direction of the arrow a. The adjusting ring 9 is now released and is free to rotate under the bias of the spring 11 (arrow a). The projection 13 engages the stop 15 to rotate the control ring 14 in the same direction. The rotating control ring 14 causes the intermediate gear 17 to move the slide 19 in the direction of the arrow b. The follower 24 remains in abutment with the front end wall 23a of the slot 23 (under the bias of the spring 28) until the cam 26 comes into abutment with the movable pointer 30 which latter is in abutment with the support 29. Once the face 27 of the cam 26 engages the pointer 30, the spring 28 cannot cause a further anticlockwise movement of the cam 26 and the latter assumes a predetermined position which corresponds to the lighting conditions detected by the photometer cell 41. As the adjusting ring 9 continues its angular movement in the direction of the arrow a under the influence of the spring 11, the rear end wall 23b of the slot 23 is moved into abutment with the follower pin 24 and the latter arrests the slide 19 as well as the adjusting ring 9 so that the ring 9 now maintains the diaphragm blades 6 in a predetermined position in which the blades define a given diaphragm opening. The adjusting ring 9 is arrested as soon as the slide 19 is brought to a halt since the control ring 14, its stop 15 and the projection 13 then oppose the bias of the spring 11. The momentary position of the diaphragm blades and the magnitude of the diaphragm opening correspond to the lighting conditions determined by the cell 41 and the moving coil instrument 31. It will be noted that the parts 16, 24 form a lost motion mechanism between the cam 29 and the control ring 14.

When the rotary movement of the driver gear 36 and of the shaft 35 is terminated, the heretofore closed shutter leaves (not shown) are caused to open for a period of time determined by the exposure time setting means 43, 46, 49 so that the film may be illuminated by light rays passing through the open shutter and through the opening defined by the diaphragm blades 6. As is known, the shutter remains closed at all times excepting when its leaves are caused to open for a period of time determined by the position of the ring 43.

In the next step, the user advances the film and thereby rotates the shaft 35 in a direction counter to the arrow c to store energy in the spring which biases this shaft. Such rotation of the shaft 35 and of the driver gear 36 causes the tensioning ring 32 to rotate counter to the direction of the arrow a and its bracket 33 entrains the stop 15 and the projection 13 in the same direction, i.e. the adjusting ring 9 is rotated clockwise, as viewed in FIG. 1, and opens the diaphragm blades 6 against the bias of the spring 11. The diaphragm is now in its fully open position and the camera is ready to take the next picture in a manner as described above.

If the operator desires to change the exposure time prior to taking the next picture, he rotates the outer setting ring 49 and thereby changes the angular position of the inner setting ring 43. During such angular displacement of the inner setting ring 43, the pin 45 is displaced by the wall of the cam slot 44 and the timer mechanism in the casing 46 is adjusted accordingly. At the same time, the inner setting ring 43 causes a rotary movement of the gear 52, of the rack 55, of the gear 57, of the racks 58, 60 and of the gear 61. Since the gear 61 is rigid with the bracket 63 and since the pin 69 couples the bracket 63 with the knob 68 and with the moving coil instrument 31, the latter participates in rotary movements of the gear 61 and adjusts the position of the pointer 30 with respect to the cam face 27 to thereby adjust the diaphragm opening in accordance with the newly selected exposure time provided, of course, that the lighting conditions remained unchanged.

In order to adjust the film sensitivity knob 68 and to thereby influence the adjustment of the diaphragm blades 6, the operator grasps this knob with his fingers and moves it in the direction of the arrow d against the bias of a non-illustrated spring to such an extent that the coupling pin 69 is withdrawn from its bore 64. The knob 68 is now free to rotate with respect to the bracket 63 and may assume a new angular position in which a selected graduation on its sensitivity-indicating scale 71 is aligned with one of the markers 70a, 70b, 70c, i.e. with the marker which corresponds to that objective 1 which is momentarily coupled with the tube 2. During such rotary adjustments, the moving coil instrument 31 participates in angular movements of the knob 68 to adjust the pointer 30 with respect to the cam face 27 and to thereby influence the adjustment of the diaphragm opening in accordance with the new setting of the film sensitivity selecting knob 68. Thus, the diaphragm is automatically adjustable in response to changing lighting conditions (through the cell 41, instrument 31, pointer 30 and operative connection 16—29), in response to changes in exposure time (ring 43, operative connection 51—63, instrument 31, pointer 30 and connection 16—29), and in response to changes in film sensitivity (knob 68, instrument 31, pointer 30 and connection 16—29).

If the user desires to take a picture without automatic regulation of the diaphragm opening, he turns the selector ring 37 to such an extent that the selected area of the diaphragm opening indicated by the scale 72 is aligned with the index 73. This moves the motion transmitting finger 38 into the path of the stop 15 and the position of the finger 38 then determines the extent to which the spring 11 may rotate the adjusting ring 9 in the direction of the arrow a. In other words, the finger 38 now controls the adjustment of the diaphragm during the next exposure.

As soon as the graduation marked A (meaning automatic setting of the diaphragm opening) on the scale 72 is moved out of alignment with the index 73, i.e. as soon as the finger 38 is moved from the end position which is shown in FIG. 1, the cam 39 closes the switch 40 and short-circuits the cell 41 so that the latter cannot supply current impulses to the instrument 31. The pointer 30 now drops to its zero position which is selected in such a way that the pointer cannot influence the rocking movements of the cam 26 because it cannot be engaged by the cam face 27 regardless of the angular position of the knob 68 and regardless of the exposure time set by the rings 43, 49. In the embodiment of FIG. 1, the pointer 30 is then assumed to have been moved to the right and into abutment with a stud 27a at the right-hand end of the cam face 27. The operative connection 16—29 and the photometer 30, 31, 41, 42, 42a are now inactive.

To make the next exposure, the operator actuates the trigger to start rotation of the shaft 35 and of the driver gear 36 in the direction of the arrow c and to cause anticlockwise rotation of the tensioning ring 32 (arrow a). The bracket 33 then permits the rings 14, 9 to rotate under the bias of the spring 11 until the stop 15 engages with the finger 38. The assembly of parts 16—30 cannot influence the diaphragm opening because, and as explained hereinabove, the pointer 30 is in its inoperative or zero position and cannot prevent the cam 26 and the slide 19 from moving to the extent determined by the finger 38. The rocking movement of the cam 26 is now limited by the stationary support 29 which latter is positioned in such a way that the stop 15 may move into abutment with the finger 38 in any desired position of the selector ring 37, i.e. even if the user selects the smallest diaphragm opening.

Referring now to FIG. 3, there is shown a modified camera which differs from the camera of FIGS. 1 and 2 in that the exposure time, too, may be adjusted in a fully automatic way. The adjusting ring 9 is provided with a motion transmitting coupling pin 80 which is parallel with the optical axis of the objective and which extends through an arcuate slot 81 of the control ring 14 into a peripheral groove 82 of the inner setting ring 43. The center of curvature of the slot 81 coincides with the common axis of the rings 9 and 14 so that the pin 80 cannot influence the ring 14 when it moves the ring 9. The pin 80 actually replaces the assembly of parts 50—61 shown in FIG. 1. The moving coil instrument 31 is now adjustable solely for the purpose of adjusting the diaphragm opening in response to a new angular position of the film sensitivity selecting wheel or knob 84, the latter rigidly connected with the instrument 31 by means of a coaxial shaft 83. The knob 84 is accessible from the exterior of the camera housing and its exposed end face is provided with a graduated scale 85 calibrated to indicate different degrees of film sensitivity. A bracket 86 which is secured to the camera housing carries markers 86a, 86b, 86c which correspond to three different objectives adapted to be coupled with the tube of the camera housing.

The rotary selector ring 37 is provided with a peripheral scale 87 adjacent to an index 88 formed on the camera housing. The graduation marked A on the scale 87 is aligned with the index 88 when the operation of the camera is automatic.

The operation of the camera shown in FIG. 3 is analogous to that of the camera illustrated in FIGS. 1 and 2 and, therefore, requires no detailed description. The sole difference is that a rotation of the shaft 35 in the direction of the arrow c not only causes rotation of the parts 32, 14, 9 in the direction of the arrow a but the pin 80 then turns the ring 43 to adjust the timer mechanism in the casing 46 in a fully automatic way. When the shaft 35 is rotated in anticlockwise direction during advancing of the film, the ring 43 is automatically rotated in clockwise direction to its starting position.

An important advantage of my improved automatic control system is that it does not necessitate substantial changes in the construction and design of presently known photometer-equipped cameras, and also that the construction of the exchangeable objective may remain practically unchanged. All that is necessary is to provide a motion transmitting connection 13, 15 between the objective-mounted adjusting ring 9 and the control ring which latter is mounted in the camera housing or, in accordance with the embodiment of FIG. 3, to provide an additional motion transmitting connection 80, 82 between the rings 9 and 43.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a camera, in combination, a camera housing; an objective removably connected with said housing; a diaphragm mounted in said objective and comprising adjusting means movable between two end positions for varying the diaphragm opening; resilient means for permanently biasing said adjusting means to one of said end positions; movable control means mounted in said camera housing; means provided on said adjusting means and on said control means for transmitting motion of said adjusting means to said control means when said adjusting means moves under the bias of said resilient means; tensioning means for moving said adjusting means and said control means counter to the bias of said resilient means so as to move said adjusting means to the other end position; and means comprising a photometer and an operative connection between said photometer and said control means for arresting the latter against the bias of said resilient means in a position corresponding to the lighting conditions detected by said photometer whereby the diaphragm opening is adjusted in accordance with such lighting conditions.

2. In a reflection camera, in combination, a camera housing; an objective removably connected with said housing; a diaphragm mounted in said objective and comprising a rotary adjusting ring for varying the diaphragm opening; resilient means in said objective for permanently biasing said adjusting ring in a direction to close the diaphragm opening; a control member rotatably mounted in said housing and concentric with said adjusting ring; means comprising a projection on said adjusting ring and a stop on said control member located in the path of said projection for rotating the control member when the adjusting ring rotates under the bias of said resilient means; a tensioning member mounted in said housing and comprising motion transmitting means located in the path of said stop for rotating said control member and said adjusting ring in a direction counter to the bias of said resilient means to enlarge the diaphragm opening; a photometer in said housing comprising a photoelectric cell and a moving coil instrument electrically connected with said cell, said instrument having a pointer movable into a plurality of positions each corresponding to a condition of lighting detected by said cell; and an operative connection between said pointer and said control member for arresting the latter in an angular position corresponding to the momentary position of said pointer when the control member is released by said tensioning member and is free to rotate under the bias of said resilient means whereby the area of the diaphragm opening corresponds to the momentary position of said pointer.

3. In a reflection camera, in combination, a camera housing; an objective removably connected with said housing; a diaphragm mounted in said objective and comprising a rotary adjusting ring for varying the diaphragm opening; resilient means in said objective for permanently biasing said adjusting ring in a direction to close the diaphragm opening; control means movably mounted in said housing and concentric with said adjusting ring; means comprising a projection on said adjusting ring and a stop on said control means located in the path of said projection for moving said control means when the adjusting ring rotates under the bias of said resilient means; a tensioning member mounted in said housing and comprising motion transmitting means located in the path of said stop for moving said control means and for rotating said adjusting ring in a direction counter to the bias of said resilient means to enlarge the diaphragm opening; a photometer in said housing comprising a photoelectric cell and a moving coil instrument electrically connected with said cell, said instrument having a pointer movable into a plurality of positions each corresponding to a condition of lighting detected by said cell; and an operative connection between said pointer and said control means for arresting the latter in a position corresponding to the momentary position of said pointer when the control means is released by said tensioning member and is free to move under the bias of said resilient means whereby the area of the diaphragm opening corresponds to the momentary position of said pointer.

4. In a camera, in combination, a camera housing; and objective connected with said housing; a diaphragm mounted in said objective and comprising rotary adjusting means for varying the diaphragm opening; resilient means for permanently biasing said adjusting means in a direction to close the diaphragm opening; rotary control means mounted in said camera housing; means provided on said adjusting means and on said control means for transmitting rotary motion of said adjusting means to said control means in only one direction when said adjusting means rotates under the bias of said resilient means; tensioning means for rotating said adjusting means and said control means counter to the bias of said resilient means so as to fully open said diaphragm; means comprising a photometer and an operative connection between said photometer and said control means for arresting the latter against the bias of said resilient means in an angular position corresponding to the lighting conditions detected by said photometer whereby the diaphragm opening is adjusted in accordance with said lighting conditions; and film sensitivity selecting means adjustably connected with said photometer for influencing the adjustment of said diaphragm.

5. In a camera, in combination, a camera housing; an objective connected with said housing; a diaphragm mounted in said objective and comprising rotary adjusting means for varying the diaphragm opening; resilient means for permanently biasing said adjusting means in a direction to close the diaphragm opening; rotary control means mounted in said camera housing; means provided on said adjusting means and on said control means for transmitting rotary motion of said adjusting means to said control means in only one direction when said adjusting means rotates under the bias of said resilient means; tensioning means for rotating said adjusting means and said control means counter to the bias of said resilient means so as to fully open said diaphragm; means comprising a photometer and an operative connection between said photometer and said control means for arresting the latter against the bias of said resilient means in an angular position corresponding to the lighting conditions detected by said photometer whereby the diaphragm opening is adjusted in accordance with said lighting conditions; exposure time setting means mounted in said housing; and an operative connection between said setting means and said photometer for adjusting the photometer in response to changes in exposure time whereby said photometer, through said first mentioned operative connection, adjusts the diaphragm opening in response to changes in exposure time.

6. In a camera as recited in claim 1, said adjusting means being turnable about the optical axis, exposure time setting means comprising a rotary setting ring mounted in said housing and concentric with said adjusting means; and means for transmitting rotary motion of said adjusting means to said setting ring to adjust said time setting means in accordance with adjustments of the diaphragm.

7. In a camera, in combination, a camera housing; an objective connected with said housing; a diaphragm mounted in said objective and comprising a rotary adjusting ring for varying the diaphragm opening; resilient means for permanently biasing said ring in a direction to close the diaphragm opening; a rotary control ring mounted in said camera housing and concentric with said adjusting ring; means for transmitting rotary motion of said adjusting ring to said control ring when the adjusting ring rotates under the bias of said resilient means and for rotating said adjusting ring counter to the bias of said resilient means; releasable tensioning means for rotating said rings counter to the bias of said resilient means; manually operable means mounted on said housing for adjusting the diaphragm opening, said manually operable means comprising a finger adapted to engage with said control ring for limiting the rotation of said rings under the bias of said resilient means; a photometer mounted in said housing; and an operative connection between said photometer and said control ring for automatically arresting the latter in an angular position corresponding to the lighting conditions detected by said photometer whereby the diaphragm opening is automatically adjusted in accordance with said lighting conditions, said finger movable by said manually operable means to an end position in which the extent of rotation of said control ring under the bias of said resilient means is determined solely by said photometer.

8. In a camera, in combination, a camera housing; an objective connected with said housing; a diaphragm mounted in said objective and comprising a rotary adjusting ring for varying the diaphragm opening; resilient means for permanently biasing said ring in a direction to close the diaphragm opening; a rotary control ring mounted in said camera housing and concentric with said adjusting ring; means for transmitting rotary motion of said adjusting ring to said control ring when the adjusting ring rotates under the bias of said resilient means and for rotating said adjusting ring counter to the bias of said resilient means; releasable tensioning means for rotating said rings counter to the bias of said resilient means; manually operable means mounted on said housing for adjusting the diaphragm opening, said manually operable means comprising a finger adapted to engage with said control ring for limiting the rotation of said rings under the bias of said resilient means; a photometer mounted in said housing, said photometer comprising a photoelectric cell and a moving coil instrument electrically connected with said cell and comprising a pointer movable into a plurality of positions each corresponding to a different lighting condition detected by said cell; an operative connection between said pointer and said control ring for automatically arresting the latter in an angular position corresponding to the lighting conditions detected by said photometer whereby the diaphragm opening is automatically adjusted in accordance with said lighting conditions, said finger movable by said manually operable means to an end position in which the extent of rotation of said control ring under the bias of said resilient means is determined solely by said photometer; normally open electric switch means connected in the circuit of said cell; and means provided on said manually operable selecting means for closing said switch means and for short-circuiting said cell when the finger of said manually operable means is moved from said end position.

9. A combination as set forth in claim 8, wherein said pointer is automatically moved to an inoperative position when said switch means is closed so that the diaphragm opening is controlled solely by said finger in response to movement of the finger from said end position.

10. In a reflection camera, in combination, a camera housing; an objective removably connected with said housing; a diaphragm mounted in said objective and comprising a rotary adjusting ring for varying the diaphragm opening; resilient means in said objective for permanently biasing said adjusting ring in a direction to close the diaphragm opening; a control member rotatably mounted in said housing and concentric with said adjusting ring; means comprising a projection on said adjusting ring and a stop on said control member located in the path of said projection for rotating the control member when the adjusting ring rotates under the bias of said resilient means; a tensioning member mounted in said housing and comprising motion transmitting means located in the path of said stop for rotating said control member and said adjusting ring in a direction counter to the bias of said resilient means to enlarge the diaphragm opening; a photometer in said housing comprising a photoelectric cell and a moving coil instrument electrically connected with said cell, said instrument having a pointer movable into a plurality of positions each corresponding to a condition of lighting detected by said cell; and an operative connection between said pointer and said control member for arresting the latter in an angular position corresponding to the momentary position of said pointer when the control member is released by said tensioning member and is free to rotate under the bias of said resilient means whereby the area of the diaphragm opening corresponds to the momentary position of said pointer, said operative connection comprising a rockable cam having a cam face adapted to engage said pointer; spring means for biasing said cam into engagement with said pointer, and a lost motion mechanism for connecting said cam with said control member.

11. A combination as set forth in claim 10, wherein said lost motion mechanism comprises a slide having an elongated slot bounded by a first and a second wall, a follower connected with said cam and extending into said slot so as to abut against one of said walls under the bias of said spring means and means for moving said slide in the longitudinal direction of said slot in response to movement of said control member under the bias of said resilient means for moving the other wall into abutment with said follower, said slide arrested to thereby arrest said control member when said pointer engages with said cam face and when said follower abuts against said other wall.

12. In a camera, in combination, a camera housing; an objective connected with said housing; a diaphragm mounted in said objective and comprising rotary adjusting means for varying the diaphragm opening; means for permanently biasing said adjusting means in a direction to close the diaphragm opening; control means movably mounted in said housing; means for transmitting motion of said adjusting means to said control means and vice versa; a photometer mounted in said housing; and an operative connection between said photometer and said control means for arresting the latter against the action of said biasing means in an angular position corresponding to the lighting conditions detected by said photometer whereby the diaphragm is adjusted in accordance with said lighting conditions, said biasing means driving not only said adjusting means but also said control means and, through the latter, said photometer.

13. In a camera, in combination, a camera housing; an objective connected with said housing; a diaphragm mounted in said objective and comprising rotary adjusting means for varying the diaphragm opening; means for permanently biasing said adjusting means in a direction to close the diaphragm opening; control means movably mounted in said housing; means for transmitting motion of said adjusting means to said control means and vice versa; a photometer mounted in said housing; an operative connection between said photometer and said control means for arresting the latter against the action of said biasing means in an angular position corresponding to the lighting conditions detected by said photometer whereby the diaphragm is adjusted in accordance with said lighting conditions; exposure time setting means mounted in said housing; and an operative connection between said setting means and said photometer for adjusting the latter in response to changes in exposure time whereby the adjustment of said diaphragm is additionally influenced by said setting means.

14. In a camera, in combination, a camera housing; an objective connected with said housing; a diaphragm mounted in said objective and comprising rotary adjusting means for varying the diaphragm opening; means for permanently biasing said adjusting means in a direction to close the diaphragm opening; control means movably mounted in said housing; means for transmitting motion of said adjusting means to said control means and vice versa; a photometer mounted in said housing; an operative connection between said photometer and said control means for arresting the latter against the action of said biasing means in an angular position corresponding to the lighting conditions detected by said photometer whereby the diaphragm is adjusted in accordance with said lighting conditions, said biasing means driving not only said adjusting means but also said control means and, through the latter, said photometer; and means for adjusting the photometer in dependency on the sensitivity of film utilized in the camera whereby the adjustment of said diaphragm is additionally influenced by said last mentioned adjusting means.

15. In a camera as recited in claim 12, exposure time setting means mounted in said housing; and means for adjusting said setting means in response to adjustments of said diaphragm whereby the exposure time is selected in dependency on the lighting conditions detected by said photometer.

16. In a camera, in combination, adjusting means for adjusting, at least partly, the extent to which film in the camera is exposed; control means cooperating with said adjusting means for driving the latter in one direction when said control means is moved in a cocking direction, said adjusting means when moving in an opposite direction moving said control means in a direction opposite to said cocking direction; photometer means for sensing the lighting conditions and being operatively connected to said control means to be driven thereby to a rest position when said control means moves in said cocking direction and to be driven by said control means in a light-sensing direction when said control moves in said direction opposite to said cocking direction; cocking means cooperating with said control means for moving the latter in said cocking direction, said cocking means when released releasing said control means for movement in a direction opposite to said cocking direction; and a single spring operatively connected to said adjusting means for urging the latter in said opposite direction, said single spring acting through said adjusting means on said control means to drive the latter in said direction opposite to said cocking direction and through said control means on said photometer means for actuating the latter to sense the lighting conditions, said cocking means moving said control means in said cocking direction in opposition to said single spring.

References Cited in the file of this patent
UNITED STATES PATENTS

| | | |
|---|---|---|
| 2,969,004 | Gebele | Jan. 24, 1961 |
| 2,993,422 | Rentschler | July 25, 1961 |
| 3,013,478 | Gebele | Dec. 19, 1961 |